United States Patent
Walker et al.

(10) Patent No.: US 8,495,698 B2
(45) Date of Patent: Jul. 23, 2013

(54) DEVICE CONTENT MANAGEMENT

(75) Inventors: Matthew D Walker, Felixstowe (GB); Nicholas J Sim, Ipswich (GB); Rory S Turnbull, Ipswich (GB)

(73) Assignee: British Telecommunications public limited company, London (GB)

( * ) Notice: Subject to any disclaimer, the term of this patent is extended or adjusted under 35 U.S.C. 154(b) by 224 days.

(21) Appl. No.: 12/934,180

(22) PCT Filed: Feb. 19, 2009

(86) PCT No.: PCT/GB2009/000451
§ 371 (c)(1),
(2), (4) Date: Sep. 23, 2010

(87) PCT Pub. No.: WO2009/118504
PCT Pub. Date: Oct. 1, 2009

(65) Prior Publication Data
US 2011/0022685 A1    Jan. 27, 2011

(30) Foreign Application Priority Data
Mar. 27, 2008    (EP) .................................... 08251120

(51) Int. Cl.
*H04N 7/16*    (2006.01)
(52) U.S. Cl.
USPC ............... 725/145; 725/14; 725/89; 725/134; 725/142
(58) Field of Classification Search
USPC .............................. 725/14, 89, 134, 142, 145
See application file for complete search history.

(56) References Cited

U.S. PATENT DOCUMENTS

| | | | |
|---|---|---|---|
| 6,345,279 B1 | 2/2002 | Li et al. | |
| 8,169,916 B1* | 5/2012 | Pai et al. | 370/238 |
| 2002/0087797 A1* | 7/2002 | Adrangi | 711/133 |
| 2005/0210530 A1* | 9/2005 | Horvitz et al. | 725/134 |
| 2006/0161635 A1* | 7/2006 | Lamkin et al. | 709/217 |
| 2009/0031384 A1* | 1/2009 | Brooks et al. | 725/127 |

OTHER PUBLICATIONS

Rejaie et al., "Mocha: A Quality Adaptive Multimedia Proxy Cache for Internet Streaming", Proceedings of the 11th. International Workshop on Network and Operating Systems Support for Digital Audio and Video. Nossdav 2001. Port Jefferson, NY, Jun. 25-26, 2001; pp. 3-10, XP001134291.

(Continued)

*Primary Examiner* — Christopher Brown
(74) *Attorney, Agent, or Firm* — Nixon & Vanderhye P.C.

(57) ABSTRACT

A method of intelligently degrading the quality of content, such as video clips and music, stored on a mobile device over time. The method takes into account the probability of a user watching each item of content and either encodes the content at a lower bit-rate, or under certain circumstances, restores the content to its original quality by side-loading the content from a network content store. The bit-rate at which the content is to be encoded is linked to the probability of a piece of content being watched. If the probability of an item of content being watched is high, then the item is stored at a high bit-rate, and conversely, for low probabilities of watching, a low bit-rate is used. If required, in order to restore an item to a higher bit rate, the original high bit rate item can be requested from a network content store. The aim being to store as much content as possible in a given finite memory, but to ensure that content which is likely to be watched is not degraded.

10 Claims, 3 Drawing Sheets

OTHER PUBLICATIONS

Pillai et al., "Multi-Fidelity Storage", VSSN Proc. ACM Second int. Workshop Video Surveill. Sens. Netw.; VSSN'04—Proceedings of the ACM Second International Workshop on Video Surveillance and Sensor Networks; VSSN'04—Proceedings of the ACM Second International Workshop on Video Survei, 2004, pp. 72-79, XP002485416.

Kodama et al., "A study on Video Data Storing and Distribution Method for Multi-Quality per Content", Proceedings of the lasted International Conference Signal and Image Processing, Aug. 23, 2004, pp. 320-323, XP008092764.

Smith et al., "Transcoding Internet Content for Heterogeneous Client Devices", Circuits and Systems, 1998. ISCAS '98. Proceedings of the 1998, New York, NY, USA, IEEE, US, vol. 3, May 31, 1998, pp. 599-602, XP010289378.

Taniguchi et al., "Implementation and Evaluation of Cooperative Proxy Caching Mechanisms for Video Streaming Services", PROC SPIE INT SOC OPT ENG; Proceedings of SPIE—The International Society for Optical Engineering ; Internet Multimedia Management Systems V 2004, vol. 5601, 2004, pp. 288-299, XP002485417.

* cited by examiner

| Content type | Initial probability of watching $P_n(t_0)$ | Half-life (days) $t_{1/2n}$ | Re-watch weighting $W_n$ | Day on which content is viewed | Initial bit-rate $BR_n(t_0)$ (kbps) | Length $L_n$ (seconds) |
|---|---|---|---|---|---|---|
| News | 0.8 | 1 | 0.3 | 2 | 256 | 300 |
| Soap | 0.8 | 3 | 0.1 | | 256 | 600 |
| YouTube Video | 0.8 | 5 | 1.5 | 3,10 | 256 | 60 |
| Music | 0.8 | 30 | 2.0 | 7 | 256 | 300 |

DEVICE CONTENT MANAGEMENT

This application is the U.S. national phase of International Application No. PCT/GB2009/000451 filed 19 Feb. 2009, which designated the U.S. and claims priority to European Application No. 08251120.5, filed 27 Mar. 2008, the entire contents of each of which are hereby incorporated by reference.

FIELD OF THE INVENTION

This invention relates to a method of managing data on a mobile device, in particular a method of managing multimedia content such as video and music files on a mobile device and by adaptively modifying the rate at which the files are encoded on the mobile device such that files with the highest probability of being viewed are maintained at the highest quality.

BACKGROUND TO THE INVENTION

Mobile devices today provide a consumer with a wealth of functions in a single unit. Such devices are increasingly being used for the consumption of multimedia content, such as video clips and music. Various techniques have been developed to enable more efficient delivery of the content to the consumer's mobile device.

One technique commonly used is streaming, where content is delivered to the device at the same time as it being consumed. As streaming is a unicast service, a separate stream is required for each device being streamed to, and thus available network bandwidth can quickly become used up. A permanent connection is also required to a device for users to watch content. Streaming is thus a costly approach and also prone to failure, for example when the device moves out of the coverage area of the given network. There is also usually a lengthy start-up delay as content is requested and buffered prior to being rendered.

An alternative approach is to side-load or download the content. This is where the content is delivered to a device and stored in advance of it being consumed. If the delivery of content is done intelligently (i.e. only the content the user is likely to be interested in) then this can prove beneficial. When content is consumed it will not suffer from the usual "re-buffering" issues associated with streaming and can be delivered continuously.

A downside of the side-loading approach is that the user has to wait for the content to arrive in its entirety before it can be consumed. Furthermore, as content is stored locally on the device, side-loading can result in storage capacity problems if the user has a lot of content on the device.

SUMMARY OF THE INVENTION

It is the aim of embodiments of the present invention to address one or more of the above stated problems, and to provide an improved system for managing multimedia files on a mobile device.

According to one aspect of the present invention, there is provided a method of data management on a mobile device, said mobile device having a plurality of media files stored therein, said method comprising for each stored media file:
  estimating a probability of a user watching said stored media file;
  calculating a bit-rate at which to encode said stored media file in dependence on the determined probability;
  determining whether the calculated bit-rate is less than or greater than the current bit-rate of the stored media file, and
  if the calculated bit-rate is less the current bit-rate, then transrating the stored media file to the calculated bit-rate and storing the transrated file on the mobile device, otherwise
  if the calculated bit-rate is greater than the current bit-rate, then requesting the download of a the media file having a higher bit-rate from a network content store.

Preferably, each media file has an associated half-life and the probability is dependent on the half-life. Furthermore, the half-life is dependent on the content type of the associated media file.

The probability may be dependent on whether the media file has been previously watched.

The calculated bit-rate may be dependent on the total available storage on the mobile device and the ratio of the storage requirement for said stored media file in relation to the total storage requirement for all the plurality of media files.

In preferred examples, the media files are multimedia files, such as video clips, audio tracks and so forth.

Preferably the network content store is connected to the mobile device over a communications network.

Preferably, the method is initiated by a processor in the mobile device when the processor is otherwise idle, or when the mobile device is placed on charge.

According to a second aspect of the present invention, there is provided a processor for a mobile device adapted to manage a plurality of media files stored on said mobile device, said processor further adapted, for each media file, to:
  estimate a probability of a user watching said stored media file;
  calculate a bit-rate at which to encode said stored media file in dependence on the determined probability;
  determine whether the calculated bit-rate is less than or greater than the current bit-rate of the stored media file, and
  if the calculated bit-rate is less the current bit-rate, then to transrate the stored media file to the calculated bit-rate and to store the transrated file on the mobile device, otherwise
  if the calculated bit-rate is greater than the current bit-rate, then to request the download of the media file having a higher bit-rate from a network content store connected to said mobile device.

According to a third aspect of the present invention, there is provided a network arrangement comprising a mobile device and a network content store, said mobile device adapted to store a plurality of media files and for each media file to:
  estimate a probability of a user watching said stored media file;
  calculate a bit-rate at which to encode said stored media file in dependence on the determined probability;
  determine whether the calculated bit-rate is less than or greater than the current bit-rate of the stored media file, and
  if the calculated bit-rate is less the current bit-rate, then to transrate the stored media file to the calculated bit-rate and to store the transrated file on the mobile device, otherwise
  if the calculated bit-rate is greater than the current bit-rate, then to request the download of the media file having a higher bit-rate from a network content store connected to said mobile device.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

In examples of the present invention, there is proposed a method of intelligently degrading the quality of content, such as video clips and music, stored on a mobile device over time. The method takes into account the probability of a user watching each item of content and either degrades that content by a specific amount or under certain circumstances, will restore the content to its original quality by side-loading the content from a network content store.

The core concept is to link the probability of a piece of content being watched with its stored bit-rate. Put another way, if the probability of an item of content being watched is high, then the item is stored at a high bit-rate, and conversely, for low probabilities of watching, a low bit-rate is used. If required, in order to restore an item to a higher bit rate, the original high bit rate item can be requested from a network content store. The aim being to store as much content as possible in a given finite memory, but to ensure that content which is likely to be watched is not degraded.

Figure 1:
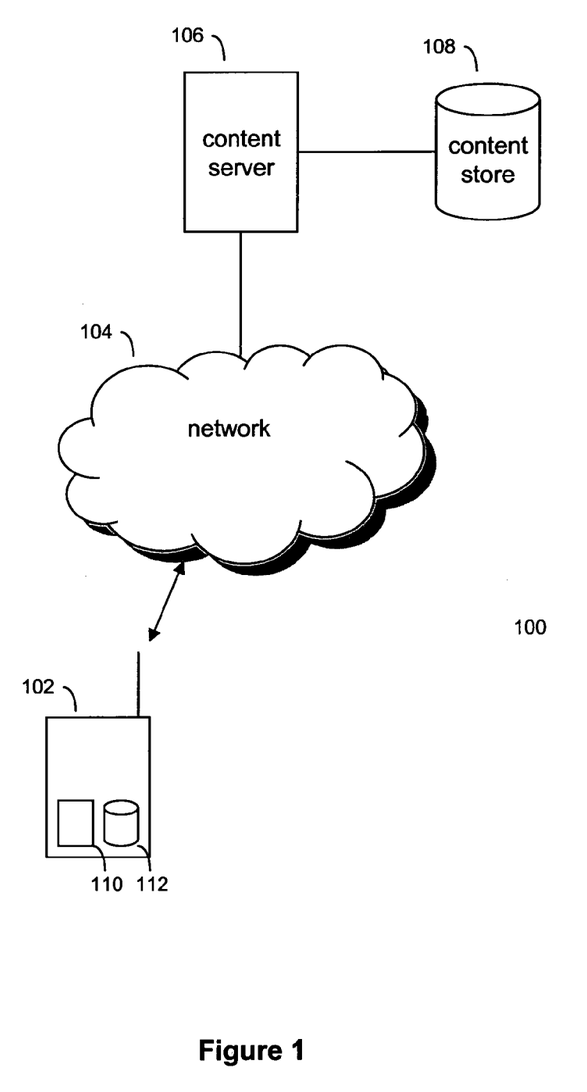
FIG. 1 is a network arrangement in an example of the present invention.

FIG. 1 illustrates a network 100 comprising a mobile device 102, a network 104, a network content server 106, and a network content store 108. The mobile device 102 may be a mobile phone, smartphone, PDA or similar, having network connectivity to the network 104. The network 104 may be any type of network providing a connection to the content server 106, such as the Internet or alternatively a private network. The network 104 may further comprise a specific network connectivity to the mobile device 102 such as a WiFi (IEEE 802.11) network with a backhaul DSL connection to the Internet, or a 3G or GSM network having a data connection to the Internet.

The content server 106 controls access to files stored in the content store 108 and assists with the handling of the transfer of files from the content store 108 to the mobile device 102. The content stored in the content store is typically multimedia content such as different categories of video (news, documentary, sport, soaps etc.), as well as music.

Whilst the content server 106 and content store 108 are shown as separate entities, a person skilled in the art will appreciate that the functionality described below can be provided by a single physical server.

The mobile device 102 comprises a processor 110 and memory 112. The memory 112 may be a hard disk, flash memory, or similar, and is used to store various data including multimedia content downloaded from the content store 108 over the network 104.

At any given time, the mobile device 102 has N items of content stored in the memory 112. Each item n in memory 112, where n∈[1,N], is stored at an associated bit rate $BR_A$. Each item n will have been previously downloaded from the content store 108. Initially, at time $t=t_0$, each item n will have been downloaded and stored at its originally encoded bit rate of $BR_n(t_0)$. Each item n may also have been consumed at some stage after download.

In examples of the present invention, a method is proposed that operates intermittently, say at fixed intervals, overnight or at times when the mobile device 102 (or more specifically the processor 110) is otherwise idle, to determine whether each item n should be transrated (transcoded) to a different bit rate to the current bit rate.

This determination is based on the calculated probability of the user consuming the item. If a higher bit rate version is required, then a process can be initiated to side-load the content from the network content store 108. The process, and more specifically the computationally intensive component of the transrating, can either be run on the mobile device 102 itself by the processor 110, or by a companion device with local connectivity to the mobile device 102 such as an intelligent hub or PC which may have greater processing power to handle the transrating.

Figure 2:
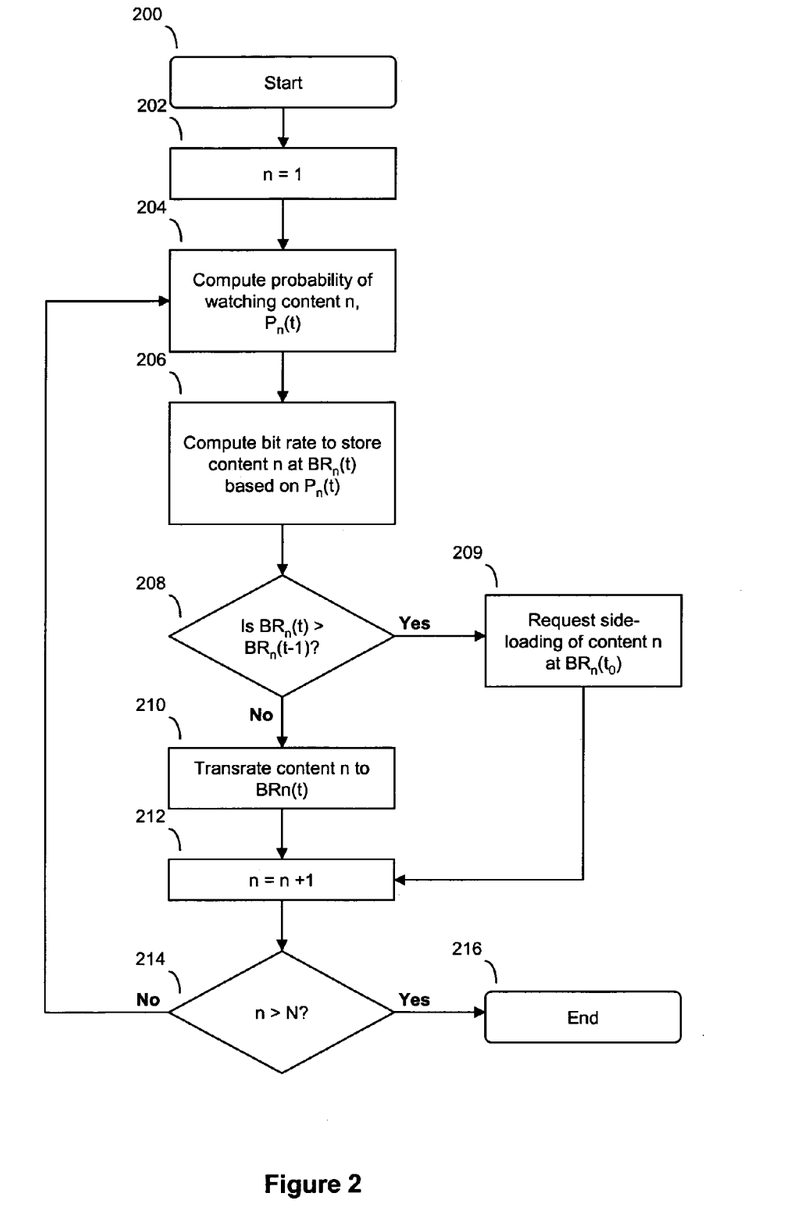
FIG. 2 is a flow chart illustrating the operation of a method in an example of the present invention.

FIG. 2 is a flow chart illustrating an example of the invention for managing the content stored on the mobile device 102.

In step 200, the process is initiated by the processor 110 as a result of some condition being met, such as at a certain time of day, or when the mobile device 102 is being charged or otherwise idle. The process is repeated for each item n stored on the mobile device 102. In step 202, the first item of content, n=1, is selected.

In step 204, the probability, $P_n$, of the user watching the selected item n is calculated. The operation of determining the probability can take many forms. Here, one method is described.

In the first instance the probability, $P_n$, of watching content item n is determined as a function of time, t, and its initial probability, $P_n(t_0)$, in accordance with a half-life formula:

$$P_n(t) = P_n(t_0) e^{\frac{-\ln(2)t}{t_{1/2n}}} \quad (1)$$

Equation (1) shows that the probability of watching content n at time t is equal to the initial probability (at time $t_0$) multiplied by an exponential decay function where $t_{1/2n}$ is the half-life of content n. Content such as news clips will typically have a short half-life $t_{1/2n}$, whereas a documentary or music track may have a considerably longer half-life.

The result of equation (1) can be further modified if the content is actually viewed by the user:

$$P_n(t) = P_n(t-1) W_n \quad (2)$$

Equation (2) shows that the probability of watching content n at a given time can be modified in relation to the previous probability multiplied by some weighting, $W_n$. The weighting $W_n$ assigned to an item of content is such that it estimates whether the content is more or less likely to be watched again if it has already been watched. For instance a news clip is probably less likely to be watched again, whereas a music track is more likely to be listened to if it has already been listened to. Thus, equation (2) is applied every time an item of content has been watched. If an item has not been watched, then equation (2) is not applied. The application of this weighting $W_n$ is therefore the main way in which the probability of watching $P_n(t)$ can increase with time.

It is envisaged that content will be assigned a value of initial probability $P_n(t_0)$ and a suitable re-watch weighting $W_n$ when the content is encoded. These values could be stored in meta-data associated with the content.

The result of equation (2) can be greater than 1. It does not make sense to have probabilities greater than 1, so a ceiling value of 1 is set using equation (3).

$$P_n(t) = \mathrm{MIN}[P_n(t), 1] \quad (3)$$

The probability of watching could be calculated with additional parameters such as association with related content, personal preferences, or some form of self learning algorithm that can modify parameters such as the re-watch weighting or initial probabilities based on past experience. Or the probability of watching could be much simpler such as a linear relationship with time.

Thus, any one of equations (1), (2) or (3) can provide the probability of watching in step 204. This output can now be used to compute the bit-rate at which the content n should be stored in step 206.

Again, the bit-rate calculation can take many forms such as setting fixed or dynamic thresholds and assigning high, medium and low quality rates to each threshold. Or, in this example it could be continuously variable and the stored bit-rate is determined by a calculation that takes the overall available storage into consideration.

The weighted storage requirement for content item n at time t, $S_n(t)$ in Kbytes, is the product of the original bit-rate of the content (as originally side-loaded from the network content store 108) $BR_n(t_0)$ in kbps, and the length of the item $L_n$ in seconds divided by 8 (to convert bits to bytes), and further weighted by the probability of watching content n, $P_n(t)$. This is illustrated by equation (4) below.

$$S_n(t) = \frac{P_n(t) BR_n(t_0) L_n}{8} \quad (4)$$

However, this is an ideal storage requirement. It needs to be scaled to ensure that it fits within (or takes full advantage of) the total storage capacity available in the mobile device, $TS(t)$. To do this the weighted storage requirement is scaled by the ratio of total available storage and the sum of weighted storage requirements. It is then divided by length to determine the bit-rate as shown by equation (5) below:

$$BR_n(t) = \frac{8}{L_n} S_n(t) \frac{TS(t)}{\sum_{n=0}^{N} S_n(t)} \quad (5)$$

Or by substituting $S_n(t)$ from equation (4), the bit-rate is equivalent to the original bit-rate weighted by the probability of watching and scaled by the same factor as in equation (5):

$$BR_n(t) = \frac{P_n(t) BR_n(t_0) TS(t)}{\sum_{n=0}^{N} S_n(t)} \quad (6)$$

At this point the bit-rate must be clipped to the original, and thus maximum available, bit-rate:

$$BR_n(t) = \mathrm{MIN}[BR_n(t), BR_n(t_0)] \quad (7)$$

Furthermore it may be worth considering removing content that is assigned a very low bit rate and possibly re-iterating the algorithm, but for simplicity this is not shown here.

Thus equation (7) provides a possible output for step 206.

In step 208, a check is made to determine if the presently calculated bit-rate $BR_n(t)$ for item n is higher than the previously calculated bit-rate $BR_n(t-1)$ i.e. the actual bit-rate of item n. If the presently calculated bit-rate $BR_n(t)$ is higher, then processing passes to step 209 to request the original version of the content n from the content store 108, which will be encoded at the higher bit-rate of $BR_n(t_0)$. If the presently calculated bit-rate $BR_n(t)$ is less than the previously calculated bit-rate, then processing passes to step 210 to transrate the content n to the new lower bit-rate $BR_n(t)$.

Turning first to step 210, if it is determined that the presently calculated bit-rate $BR_n(t)$ is less than the previously calculated bit-rate $BR_n(t-1)$, then the content n is transrated to the new lower bit-rate of $BR_n(t)$ and the originally stored content n is deleted and replaced with the content n at the new bit-rate. Transrating usually involves a reduction in the bit rate of the content. For video content, a reduction in bit rate can be achieved by several methods such as reducing the frame rate, the frame resolution or by using coarser quantisation. Conversion to a different format may also be considered (e.g. MPEG2 to MPEG4) to fulfil a reduction in bit rate.

In step 209 the mobile device 102 requests that content n with the original higher bit rate of $BR_n(t_0)$ is side-loaded from the content store 108 and then stored locally in the memory 112. The request and subsequent side-loading may be performed at a later scheduled time, or when the conditions for the mobile device 102 to connect to the network content store 108 are more suitable. For example, the mobile device 102 may not at the present time be able to establish a network connection with the content store 108, or the connection speed may not be sufficient for the side-loading to take place within a specified time frame.

In a further example, the calculated bit-rate $BR_n(t)$ may be the same or within an acceptable tolerance/difference of the previously calculated bit-rate $BR_n(t-1)$, and thus no transrating or side-loading is necessary.

After steps 209 or 210 have taken place (or if it is deemed that no side-loading or transrating was necessary), processing continues to step 212, where the next item of content is examined by incrementing n by 1. In step 214, we test to see if the last item has been reached, given by n>N, where N is the total number of items of content. If n is not greater than N, then the last item has not been exceeded, and processing passes back to step 204 to process the incremented item number. If n is greater than N, then the last item has been exceed, and processing finishes at step 216.

A model showing the above method has been built using Matlab programming language, and is shown the attached the Appendix. The data used in this example model is summarised in the table in FIG. 3, with the results shown in the graphs of FIG. 4.

Figure 3:
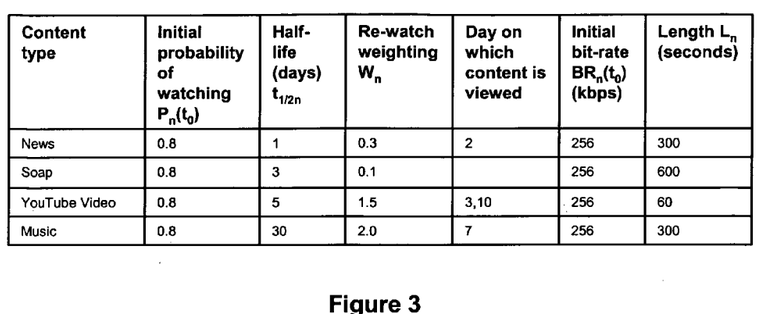
FIG. 3 is a table showing various parameters for four different items of content in an example of the present invention.

The table in FIG. 3 shows four items of content of different types: a news clip, a soap, a YouTube video, and a music track. All have the same initial probability of watching (0.8) and the same initial bitrate (256 kbps) but have different half-lives and re-watch weightings.

The news content type has a very short half-life of 1 day, representing the fact that it becomes out of date quite quickly, and also a small re-watch weighting of 0.3, indicating that once it has been watched it is unlikely to be watched again. In contrast, the music and YouTube video types have re-watch weightings of 2 and 1.5 respectively, indicating that once they have been watched they are more likely to be watched again.

Figure 4:
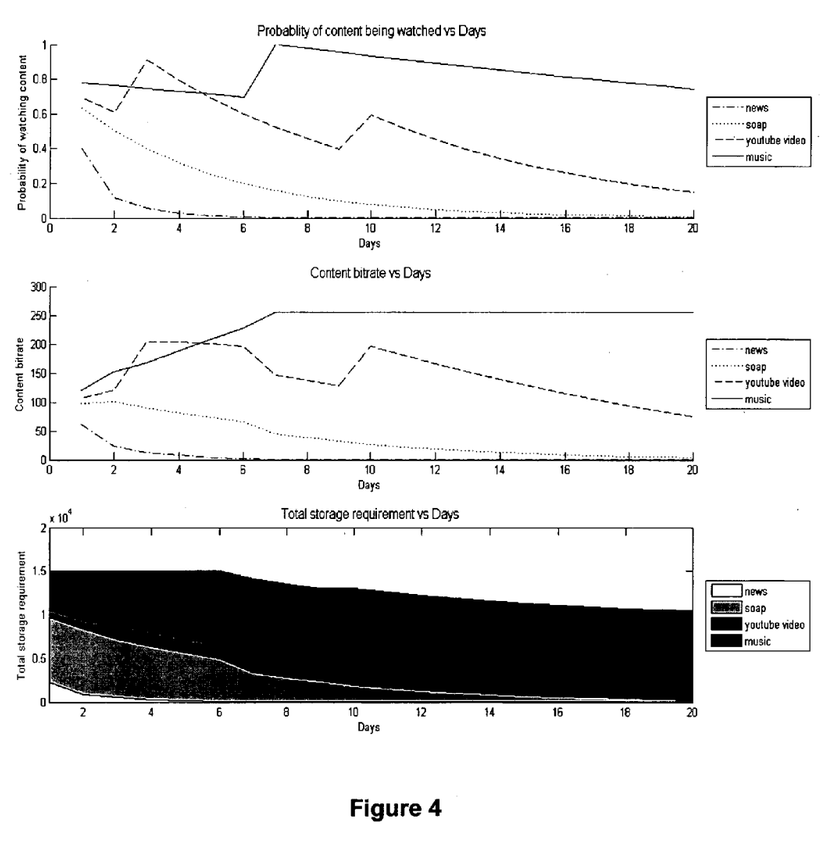
FIG. 4 is a series of three graphs showing how the probabilities of watching, content bit-rate and total storage requirement vary over time.

In FIG. 4, the first plot shows how the probability of watching each of these pieces of content varies in response to time (days) and watching habits. The news content has a very rapid decay as a result of its short half-life combined with it being watched on the 2nd day forcing its probability of watching to nearly zero by day 4. The music content on the other hand has a very slow decay and on day 7 when it is listened to its probability increases as a result of its greater than 1 re-watch weighting. The YouTube video has a half life of 5 so every 5 days its probability drops by half, but whenever it is watched (days 3 and 10) the probability of watching increases. The soap is never watched in this example so exhibits a gradual decline in its probability of watching purely as a function of its half-life.

The second plot in FIG. 4 shows how these calculated probabilities of watching influence the stored bit-rates. The news and soap content bit-rates decline over time, while the music content bit-rate increases and the YouTube video bit-rate fluctuates. The main reason for the music content bit-rate increasing is because the limited device memory (15 MB in this example) only allows the full bit-rate music to be accommodated when the required bit-rate of the other pieces of content has reduced. The YouTube video bit-rate increases on days 3 and 10 in line with when it is watched, but on day 7 it is reduced as a direct result of the music being listened to and the impact this has on the overall available storage.

The final plot in FIG. 4 gives a visual representation of how the total storage of the device is filled with the different pieces of content. This takes into account both the calculated bit-rate and the file length. It is clear that the storage is dominated by the music which is the content most likely to be listened to. However, in the first few days the bit-rate at which it could be stored is challenged by the soap and very early on the news content. The YouTube video does not have a great influence in the overall storage requirement as its length is so short (60 seconds in this example).

For simplicity in this example only one piece of each type of content is modelled and they are all side-loaded onto the mobile device at time $t_0$. In reality there will most likely be several hundred pieces of content of a wide range of types on the device at any given time. Over time new pieces of content will become available and existing ones will be deleted so it should be appreciated that the resulting situation is likely to be more complex than that described here.

In general, it is noted herein that while the above describes examples of the invention, there are several variations and modifications which may be made to the described examples without departing from the scope of the present invention as defined in the appended claims. One skilled in the art will recognise modifications to the described examples.

APPENDIX

MatLab model code

```
clear
close all
C = struct(...
    'type',{'news','soap','youtube video','music'},...
    'prob',{0.8,0.8,0.8,0.8},...
    'orig_bitrate',{256,256,256,256},...        % kbps
    'length',{300,600,60,300},...               % seconds
    'half_life',{1,3,5,30}, ...                 % days
    'rewatch_weight',{0.3,0.1,1.5,2},...
    't0',{0,0,0,0},...
    'weighted_storage_req',{0,0,0,0}...
    )
days_to_plot = 20;
% initilaise watching matrix
watched = zeros(length(C),days_to_plot);
watched(1,2) = 1;           % News on 2nd day
watched(3,3) = 1;           % YouTube video on 3th day...
watched(3,10) = 4;          %   and 10th day
watched(4,7) = 1;           % Music on 7th day
%initialise probability matrix (for plotting)
prob_matrix = zeros(length(C),days_to_plot);
% loop for each piece of content
for k=1:length(C)
    % compute probability of watching...
    for t=1:days_to_plot
        % consider if content has been watched
        if(watched(k,t)>0)
            C(k).prob=prob_matrix_(k,t-1)*C(k).rewatch_weight
            if(C(k).prob>1)
                C(k).prob=1
            end
            C(k).t0=t;
        end
        % calculate exponetial decay of probability as a function of time
        prob_matrix(k,t)=C(k).prob*exp(-log(2)/C(k).half_life*(t-C(k).t0));
    end
end
subplot(3,1,1)
hold on
plot(prob_matrix(1,:), '-.k')
plot(prob_matrix(2,:), ':k')
plot(prob_matrix(3,:), '--k')
plot(prob_matrix(4,:), '-k')
hold off
xlabel('Days')
```

APPENDIX-continued

MatLab model code

```
ylabel('Probability of watching content')
title('Probablity of content being watched vs Days','FontSize',12)
legend(C.type,'Location','EastOutside')
% calculate bit rate encoding for each piece of content
total_avail_mem =15;    % MBs
bit_rate_matrix=zeros(length(C),days_to_plot);
storage_req_matrix=zeros(length(C),days_to_plot);
for t=1:days_to_plot
    % calculate a 'total score' sum of storage requirements, weighted by
    % probability of watching
    total_weighted_storage_req = 0;
    for k=1:length(C)
        C(k).weighted_storage_req = prob_matrix(k,t)*C(k).orig_bitrate*C(k).length/8;
        total_weighted_storage_req  =  total_weighted_storage_req  +  C(k).weighted_storage_req;
    end
    % compute bit rate to store content at given limited memory
    scaling = total_avail_mem * 1000 / total_weighted_storage_req;
    for k=1:length(C)
        bit_rate_matrix(k,t) = prob_matrix(k,t)*C(k).orig_bitrate*scaling;
        if bit_rate_matrix(k,t)>C(k).orig_bitrate
            bit_rate_matrix(k,t)=C(k).orig_bitrate;
        end
    end
    % sanity check
    % compute storage requirement
    for k=1:length(C)
        storage_req_matrix(k,t) = (bit_rate_matrix(k,t)*C(k).length/8);
    end
end
subplot(3,1,2)
hold on
plot(bit_rate_matrix(1,:), '-.k')
plot(bit_rate_matrix(2,:), ':k')
plot(bit_rate_matrix(3,:), '--k')
plot(bit_rate_matrix(4,:), '-k')
hold off
xlabel('Days')
ylabel('Content bitrate')
title('Content bitrate vs Days','FontSize',12)
legend(C.type,'Location','EastOutside')
subplot(3,1,3)
area_plot=area(storage_req_matrix')
set(area_plot(1),'FaceColor',[1,1,1])
set(area_plot(2),'FaceColor',[0.6,0.6,0.6])
set(area_plot(3),'FaceColor',[0.3,0.3,0.3])
set(area_plot(4),'FaceColor',[0,0,0])
xlabel('Days')
ylabel('Total storage requirement')
title ('Total storage requirement vs Days','FontSize',12)
legend(C.type,'Location','EastOutside'
```

The invention claimed is:

1. A method of data management on a mobile device, said mobile device having a plurality of media files stored therein, said method comprising for each stored media file:
  estimating a probability of a user watching said stored media file;
  calculating a bit-rate at which to encode said stored media file in dependence on the determined probability;
  determining whether the calculated bit-rate is less than or greater than the current bit-rate of the stored media file, and
  if the calculated bit-rate is less than the current bit-rate, then transrating the stored media file to the calculated bit-rate and storing the transrated file on the mobile device, otherwise
  if the calculated bit-rate is greater than the current bit-rate, then requesting the download of a media file having a higher bit-rate then the current bit-rate of the stored media file from a network content store.

2. A method according to claim 1, wherein the each media file has an associated half-life and the probability is dependent on the half-life.

3. A method according to claim 2, wherein the half-life is dependent on the content type of the associated media file.

4. A method according to claim 1, wherein the probability is dependent on whether the media file has been previously watched.

5. A method according to claim 1, wherein the calculated bit-rate is dependent on the total available storage on the mobile device and the ratio of the storage requirement for said stored media file in relation to the total storage requirement for all the plurality of media files.

6. A method according to claim 1, wherein the media files are multimedia files.

7. A method according to claim 1, wherein the network content store is connected to the mobile device over a communications network.

8. A method according to claim 1, wherein the method is initiated when the mobile device is idle.

9. A processor for a mobile device adapted to manage a plurality of media files stored on said mobile device, said processor further adapted, for each media file, to:
- estimate a probability of a user watching said stored media file;
- calculate a bit-rate at which to encode said stored media file in dependence on the determined probability;
- determine whether the calculated bit-rate is less than or greater than the current bit-rate of the stored media file, and if the calculated bit-rate is less than the current bit-rate, then to transrate the stored media file to the calculated bit-rate and to store the transrated file on the mobile device, otherwise
- if the calculated bit-rate is greater than the current bit-rate, then to request the download of the media file having a higher bit-rate then the current bit-rate of the stored media file from a network content store connected to said mobile device.

10. A network arrangement comprising a mobile device and a network content store, said mobile device adapted to store a plurality of media files and for each media file to:
- estimate a probability of a user watching said stored media file;
- calculate a bit-rate at which to encode said stored media file in dependence on the determined probability;
- determine whether the calculated bit-rate is less than or greater than the current bit-rate of the stored media file, and
- if the calculated bit-rate is less than the current bit-rate, then to transrate the stored media file to the calculated bit-rate and to store the transrated file on the mobile device, otherwise
- if the calculated bit-rate is greater than the current bit-rate, then to request the download of the media file having a higher bit-rate than the current bit-rate of the stored media file from a network content store connected to said mobile device.

* * * * *